United States Patent [19]

Burckhardt et al.

[11] 3,791,702

[45] Feb. 12, 1974

[54] BRAKE-FORCE CONTROL SYSTEM FOR VEHICLES, ESPECIALLY MOTOR VEHICLES

[75] Inventors: Manfred H. Burckhardt, Waiblingen; Hellmut Krohn, Esslingen; Horst Grossner, Gerardstetten; Hans-Jorg Florus, Coppingen, all of Germany

[73] Assignee: Daimler-Benz Aktiengesellschaft, Stuttgart-Unterturkheim, Germany

[22] Filed: Aug. 4, 1971

[21] Appl. No.: 168,909

[30] Foreign Application Priority Data
Aug. 4, 1970 Germany............ P 20 38 599.3

[52] U.S. Cl............. 303/21 BE, 303/20, 303/21 A
[51] Int. Cl............................................. B60t 8/08
[58] Field of Search 188/181 R, 181 A; 303/20, 21; 340/52 R

[56] References Cited
UNITED STATES PATENTS

| | | |
|---|---|---|
| 3,017,145 | 1/1962 | Yarber............................ 303/21 BE |
| 3,433,536 | 3/1969 | Skinner............................ 303/21 A |
| 3,467,444 | 9/1969 | Leiber............................ 188/181 A X |
| 3,556,610 | 1/1971 | Leiber............................ 303/21 P |
| 3,630,579 | 12/1971 | Rodi............................ 188/181 A X |
| 3,652,132 | 3/1972 | Ando et al.................. 188/181 A X |

*Primary Examiner*—Duane A. Reger
*Assistant Examiner*—Stephen G. Kunin
*Attorney, Agent, or Firm*—Craig and Antonelli

[57] ABSTRACT

A brake force control system for vehicles, especially for motor vehicles in which the brake medium pressure acting on the brakes is controlled as a function of the rotary condition of the wheel by magnetically controlled inlet and outlet valves in the manner of a three point control; during each control of an inlet valve a signal causing a short defined opening of the outlet valve is simultaneously fed to the associated outlet valve by way of a coupling apparatus, preferably consisting of a circuit including a resistor and reactive impedance whose values may be varied as a function of certain characteristics of the brake force control system.

21 Claims, 2 Drawing Figures

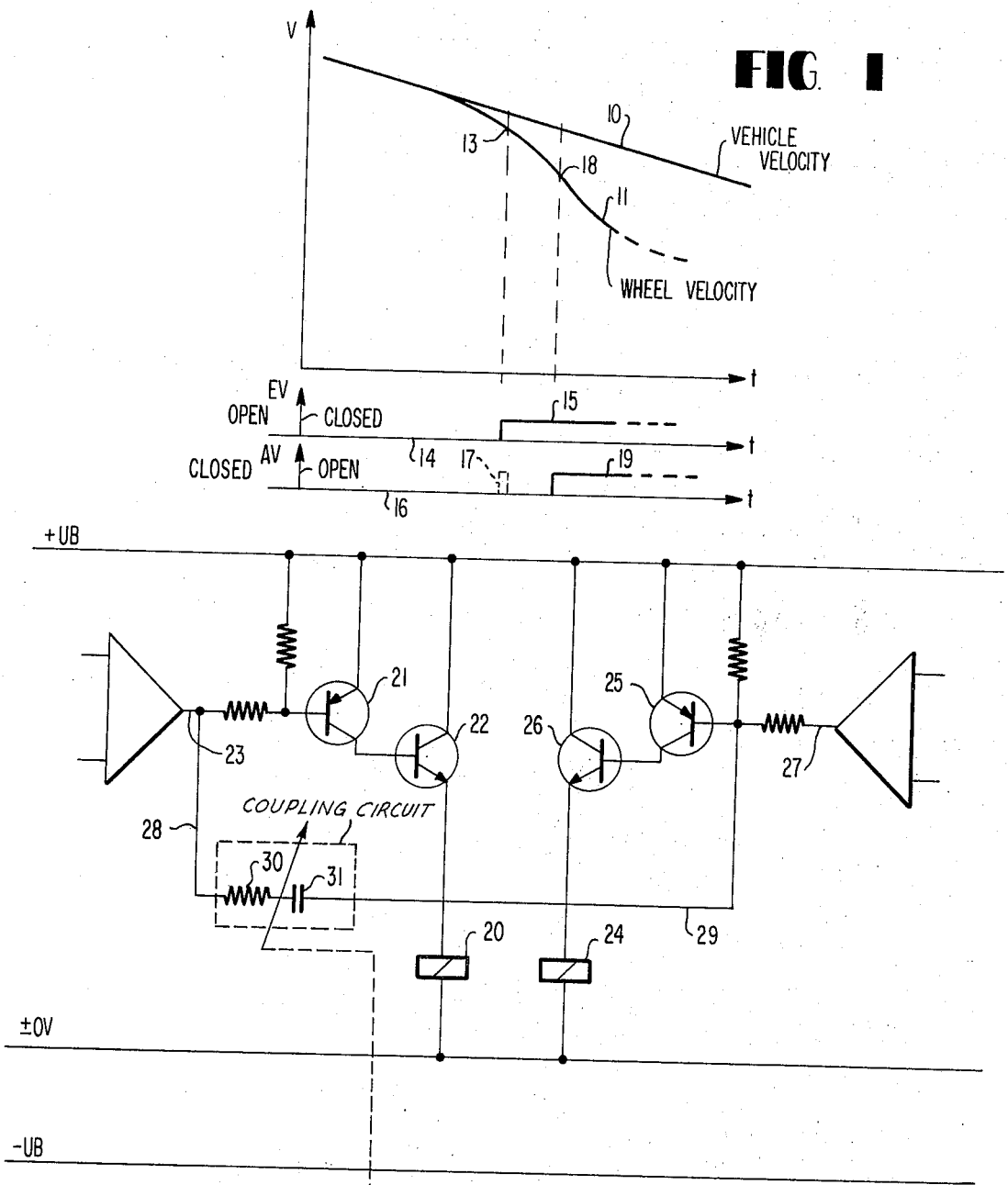
FIG. 1
FIG. 2
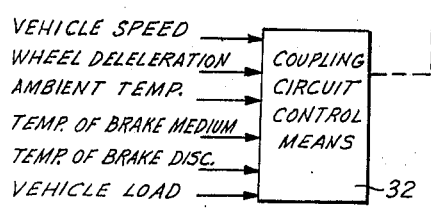
INVENTORS
MANFRED H. BURCKHARDT
HELLMUT KROHN
HORST GROSSNER
HANS-JÖRG FLORUS
BY Craig, Antonelli and Hill
ATTORNEYS

BRAKE-FORCE CONTROL SYSTEM FOR VEHICLES, ESPECIALLY MOTOR VEHICLES

The present invention relates to a brake force control system for vehicles, especially motor vehicles, whereby the brake medium pressure acting on the brakes is controlled by means of signals in dependence on the condition of rotation of the wheel by magnetically controlled inlet and outlet valves in the manner of a three-point control.

Brake force control systems of the aforementioned type act in such a manner that either the pressure built up in the master brake cylinder acts fully on the brakes (inlet valve open, outlet valve closed) or that only a pressure existing at the brake is maintained (inlet and outlet valves closed) or that the pressure prevailing at the brake is more or less decreased (inlet valve closed, outlet valve opened). One aims in these brake force control systems to reaccelerate the wheel running into a large deceleration as orderly as possible, i.e., to reestablish as quickly as possible the contact with the road and therewith the full brake effect corresponding to the prevailing friction value. The control signal for the inlet valve, however, has to last for a predetermined time in order to be able to differentiate from any possibly occurring disturbance or error signals—caused for example by unevennesses of the road. However, during the time delay necessary as a result thereof, the wheel may run under certain circumstances into an excessive slippage. This means, in other words, the control of the inlet valve would become effective too late in such cases.

The present invention is concerned with the task to avoid the described disadvantages. Accordingly, an arrangement is to be provided, by means of which it is possible to compensate again the absolutely necessary time delay. The underlying problems are solved according to the present invention in the aforementioned brake force control systems in that during each control of an inlet valve, simultaneously a signal is fed by way of a coupling element to the associated outlet valve for a defined opening of short duration on the part of the outlet valve.

The present invention offers the advantage that now during the closing of the inlet valve, i.e., therefore during the closing or cutting off of the brake from the brake medium pressure in the master cylinder, at the same time the outlet valve is opened for a short period of time and a slight drop of the pressure at the brake is already achieved thereby. A type of lead, so to speak of, in the progress of the described control cycle is achieved thereby. The respective wheel in question can therefore run more quickly from the deceleration into the acceleration phase.

The present invention prefers a solution according to which the coupling element—determining the duration of the signal for the outlet valve—is adapted to be influenced by one or several characteristic magnitudes or parameters of the brake force control system. It is possible thereby in an advantageous manner to control the pressure decrease and therewith practically the reentry into the reacceleration corresponding to the respective necessary conditions.

One proposal of the present invention is to the effect that the coupling element is so constructed that with an increasing vehicle velocity the duration of the signal becomes longer. It is achieved thereby that at high vehicle velocity a more rapid reacceleration of the wheel takes place, i.e., the duration of the wheel in the deceleration condition or even in the locked condition is reduced.

The present invention additionally proposes to construct the coupling member in such a manner that with a large rotational deceleration of the respective wheel the duration of a signal is longer than at smaller rotary declerations. With such an arrangement, inter alia, also the load condition of the vehicle can be detected and incorporated into the control cycle. This can be of particular significance, for example, for the driving comfort in buses.

Finally, according to further proposal of the present invention the coupling element may be so constructed that with changing temperature also the duration of the signal is variable. Several characteristic magnitudes of the system vehicle-road-control may now be detected and incorporated into the control cycle. Thus, it would be possible, for example, to detect the outside temperature and to construct the tendency of the influencing of the coupling element in such a manner that with the colder outside temperature the duration for the opening of the outlet valve increases. This means during winter, when the danger of icy road conditions exist, a more rapid relief from the brake medium pressure would occur and the wheel would again accelerate much more rapidly. Furthermore, the brake medium temperature could be taken into consideration in such a manner that the duration of the opening of the outlet valve becomes the longer the colder the brake medium. It would be possible thereby to compensate for the changes of the viscosity of the brake medium. Finally, however, also the temperature of the brake, for example, of the brake disc can be taken into consideration in such a manner that with a brake disc that is not quite as hot—i.e., with which a better braking takes place—the duration of the opening of the outlet valve is shorter than with a very hot brake disc.

In detail it is additionally proposed by the present invention that the line controlling the inlet valve is connected with the line controlling the respective outlet valve by a coupling element consisting of a capacitor and of a resistor. The coupling element, of course, may also consist of a resistance and of an inductance. The aforementioned influencing magnitudes are thereby taken into consideration by conventional means changing the capacity or inductance and/or the resistance. As to the rest, it should be mentioned that, of course, also several of the aforementioned influencing magnitudes or all of them could be taken into consideration in one and the same system.

Accordingly, it is an object of the present invention to provide a brake force control system for vehicles, especially for motor vehicles which avoids by a simple means the aforementioned shortcomings and drawbacks encountered in the prior art.

Another object of the present invention resides in a brake force control system for vehicles, especially motor vehicles, in which an excessive slippage is effectively precluded notwithstanding the need for differentiating between error signals and true control signals.

A further object of the present invention resides in a brake force control system for vehicles in which the inlet valve of the brake force control system is timely controlled to assure optimum operating conditions.

Still a further object of the present invention resides in a brake force control system in which the outlet valve is opened for a short period of time whenever the inlet control valve receives a closing signal.

Another object of the present invention resides in a brake force control system for vehicles in which the reacceleration of the wheel is optimized.

A further object of the present invention resides in a brake force control which permits the ready incorporation of various parameters affecting the brake efficacy of the system.

These and further objects, features and advantages of the present invention will become more apparent from the following description when taken in connection with the accompanying drawing which shows, for purposes of illustration only, one embodiment in accordance with the present invention, and wherein:

FIG. 1 is a velocity-time diagram explaining the operation of the present invention, and FIG. 2 is a block diagram of an installation according to the present invention.

Referring now to the drawing, according to FIG. 1, a wheel is decelerated during braking according to the curve 11 as compared to the vehicle velocity represented by line 10. For the described reasons a control signal for the inlet valve initiated upon exceeding the threshold value, has to last for a predetermined time in order to exclude error signals. In the illustrated example the control pulse for the inlet valve EV is produced at point 13. The inlet valve EV—illustrated by the line 14—is normally open and as a result of this control signal passes over into the closed condition according to line 15. Simultaneously, the outlet valve AV, illustrated in its course of operation, by the line 16, is opened for a short defined period of time according to the dash line 17. A very slight relief of the brake from the brake pressure occurs already as a result thereof so that the wheel continues to be decelerated only slightly. Under certain circumstances it may even be reaccelerated already. As a result thereof the number of control cycles is reduced. This becomes favorable for the braking comfort.

In the illustrated embodiment it is assumed for the sake of completion that the wheel continues to be decelerated up to the point 18, at which the control signal for the outlet valve is produced. The outlet valve is now opened in a normal manner according to line 19 so that the wheel can now again run into its acceleration phase.

According to FIG. 2 the magnetically controlled inlet valve 20 is controlled by a signal supplied by way of the line 23 by means of an amplifier arrangement consisting of driver 21 and of output or final stage 22. This signal is produced in a conventional manner by an electronic circuit (not shown). Since such circuit is known as such and forms no part of the present invention, a detailed description thereof is dispensed with herein. In the same manner the magnetically controlled outlet valve 24 is controlled by a signal present in the line 27 by means of an amplifier arrangement consisting of driver 25 and of output or final stage 26. This control takes place in such a manner that in the presence of a signal, i.e., of a positive voltage in the line 23, the inlet valve 20 is opened whereas in the case of the disappearance of this signal (when the voltage becomes zero or negative) in the line 23, the inlet valve 20 closes. Analogously the outlet valve 24 is opened in the presence of a signal, i.e., of a positive voltage in the line 27 whereas in the absence of this voltage (zero or negative voltage) the outlet valve 24 closes. For the sake of convenience only the energizing coils of these valves are shown in FIG. 2.

The two lines 23 and 27 are now connected according to this invention by a coupling circuit shown in dashed line which consists of the line sections 28 and 29 as well as of a resistance 30 of a capacitor 31. The resistance and/or capacitance of the circuit elements 30 and 31 may thereby be variable by conventional means. The signal, which is present in the line 23 for the control of the inlet valve 20, is transmitted by this coupling circuit to the line 27 and therewith simultaneously controls the outlet valve 24. The duration of this short defined control, i.e., the opening of the outlet valve 24 is determined by the values of the resistance and of the capacity of the coupling circuit. The control thereby takes place in a well-known manner, i.e., in case of a change in polarity of the voltage 23, the condenser 31 of the coupling circuit is charged by way of the resistor 30 and its charging current acts thereby on the driver 25. The duration of the control pulse for the outlet valve is determined essentially by the time constants of the elements 30 and 31 of the coupling circuit, as is well known. As mentioned above, either or both of the elements 30 and 31 may be variable by conventional means such as a coupling circuit control means 32, for example, either mechanically or electronically in case of use of semiconductor devices, whereby the control of these elements may be made in such a manner as to take into consideration the driving velocity of the vehicle, the load of the vehicle, the ambient temperature, the temperature of the brake medium and/or the temperature of the brake discs in the sense described above. Since the control of such capacitors and resistors is well known in the art, particularly in connection with integrated circuits using semiconductor elements, and since any suitable sensing devices for producing the desired control magnitudes, normally in the form of electrical signals, can be used, a detailed description of such controls is dispensed with herein.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are incompassed by the scope of the appended claims.

We claim:

1. A brake force control system for vehicles with a brake medium for the brakes thereof, especially motor vehicles, in which a brake medium pressure acting on a brake is controlled by signals in dependence on the rotary condition of a wheel by magnetically controlled inlet and outlet valve means, characterized by opening means for causing a defined opening of short duration of the outlet valve means, the opening means including coupling means for supplying during each control of an inlet valve means a signal to the associated outlet valve means to cause the defined opening.

2. A brake force control system according to claim 1, characterized in that the coupling means determining the duration of the signal for the outlet valve means is adjustable by at least one characteristic magnitude of the brake force control system.

3. A brake force control system according to claim 2, characterized in that the coupling means is adjustable as a function of several characteristic magnitudes of the brake force control system.

4. A brake force control system according to claim 3, characterized in that one of said several characteristic magnitudes is the vehicle velocity.

5. A brake force control system according to claim 2, characterized in that the coupling means is operable in such a manner that with a greater rotary deceleration of the respective wheel the duration of the signal is larger than with a smaller rotary deceleration.

6. A brake force control system according to claim 2, characterized in that the coupling means is operable to increase the duration of the signal fed to the associated outlet valve means with an increasing vehicle velocity.

7. A brake force control system according to claim 6, characterized in that the coupling means is operable in such a manner that with a greater rotary deceleration of the respective wheel the duration of the signal is larger than with a smaller rotary deceleration.

8. A brake force control system according to claim 7, characterized in that the coupling means is operable in such a manner that the duration of the signal changes with changes in temperature.

9. A brake force control system according to claim 8, wherein the temperature is the ambient temperature.

10. A brake force control system according to claim 9, characterized in that said temperature is the temperature of the brake medium.

11. A brake force control system according to claim 10, characterized in that the temperature is the temperature of the brake disc.

12. A brake force control system according to claim 11, characterized in that a line controlling the inlet valve means is connected with the coupling means including capacitor means and resistor means.

13. A brake force control system accordint to claim 12, characterized in that at least one of said capacitor and resistor means is adjustable to control the duration of said signal.

14. A brake force control system according to claim 2, characterized in that the coupling means is operable in such a manner that the duration of the signal changes with changes in temperature.

15. A brake force control system according to claim 14, wherein the temperature is the ambient temperature.

16. A brake force control system according to claim 14, characterized in that said temperature is the temperature of the brake medium.

17. A brake force control system according to claim 14, characterized in that the temperature is the temperature of the brake disc.

18. A brake force control system according to claim 1, characterized in that a line controlling the inlet valve means is connected with the coupling means including capacitor means and resistor means.

19. A brake force control system according to claim 18, characterized in that the coupling means includes line sections interconnecting the line controlling the inlet valve means with a line controlling the outlet valve means.

20. A brake force control system according to claim 18, characterized in that at least one of said capacitor and resistor means is adjustable to control the duration of said signal.

21. A brake force control system according to claim 1, characterized in that said coupling means is responsive to a signal for closing the inlet valve means for simultaneously supplying the associated outlet valve means with a short duration signal for opening the outlet valve means for a defined period.

* * * * *